United States Patent
Mishin

(10) Patent No.: US 9,858,131 B2
(45) Date of Patent: Jan. 2, 2018

(54) MESSAGE PROCESSING

(71) Applicant: INTERNATIONAL BUSINESS MACHINES CORPORATION, Armonk, NY (US)

(72) Inventor: Dmitry Mishin, Cork (IE)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 14/962,209

(22) Filed: Dec. 8, 2015

(65) Prior Publication Data

US 2016/0170817 A1    Jun. 16, 2016

(30) Foreign Application Priority Data

Dec. 16, 2014  (GB) .................................. 1422372.1

(51) Int. Cl.
*G06F 13/00* (2006.01)
*G06F 9/46* (2006.01)
*G06F 9/54* (2006.01)

(52) U.S. Cl.
CPC .................................... *G06F 9/546* (2013.01)

(58) Field of Classification Search
None
See application file for complete search history.

(56) References Cited

U.S. PATENT DOCUMENTS

| | | | |
|---|---|---|---|
| 5,761,696 A * | 6/1998 | Giordano | G06F 17/30445 707/999.001 |
| 5,870,743 A * | 2/1999 | Cohen | G06F 17/30445 |
| 6,442,139 B1 | 8/2002 | Hosein | |
| 7,380,005 B1 | 5/2008 | Li et al. | |
| 7,653,741 B2 | 1/2010 | Mazzitelli | |
| 7,680,793 B2 | 3/2010 | Wong et al. | |
| 7,814,500 B2 | 10/2010 | Weber | |
| 8,180,823 B2 | 5/2012 | Hasti et al. | |

(Continued)

FOREIGN PATENT DOCUMENTS

WO    WO 01/33407 A2    5/2001

OTHER PUBLICATIONS

Oracle, "Database Administrator's Guide for Oracle Essbase", no date, pp. 1-14.*

(Continued)

*Primary Examiner* — Lechi Truong
*Assistant Examiner* — Phuong N Hoang
(74) *Attorney, Agent, or Firm* — Heslin Rothenberg Farley & Mesiti P.C.

(57) ABSTRACT

A method, system, and computer program product include a processor estimating a first time value representing an amount of time for a service to process a set of messages and estimating a second time value representing an amount of time for a consumer to process the set of messages. The processor divides the set of messages into a first block of messages and a second block of messages. The size of the second block is larger than the size of first. The processor passes the first block to a first service and the second block to a second service, where a first time period, in which the second service will process the second block, is equal to a second time period, in which the first service and the consumer will process the first block. The services are parallel and are serially connected on an output side to the consumer.

15 Claims, 6 Drawing Sheets

(56) References Cited

U.S. PATENT DOCUMENTS

| 8,185,912 B1 | 5/2012 | Leonard |
| 8,763,013 B2 | 6/2014 | Fateev et al. |
| 2003/0004949 A1* | 1/2003 | Hong ................ G06F 17/30595 |
| 2003/0076827 A1* | 4/2003 | Henrion ................ H04L 49/201 |
| | | 370/390 |
| 2014/0068623 A1* | 3/2014 | Kanemasa ............ G06F 9/4881 |
| | | 718/103 |
| 2014/0160935 A1* | 6/2014 | Zecharia ................ H04L 47/34 |
| | | 370/235 |

OTHER PUBLICATIONS

International Search Report, Application No. GB14222372.1, filed Dec. 16, 2014, dated Jun. 2015, 3 pages.

* cited by examiner

MESSAGE PROCESSING

PRIOR FOREIGN APPLICATION

This application claims priority from United Kingdom (GB) patent application number 1422372.1, filed Dec. 16, 2014, which is hereby incorporated herein by reference in its entirety.

BACKGROUND

Messages being distributed between multiple parallel services for processing, and then passed to a single consumer, such as a database or a message bus, is a common scenario in software engineering. The messages may come for processing in bursts from a producer (for example being collected every N minutes) and the consumer requires a minimal delay between data being available for the system and data being accessible for the end user. One de-queue policy is a static threshold based policy. In this policy, the producer passes to a service the minimum of either all of the available messages or the threshold number of messages for processing. In the case of collocated services, the delay caused by the consumer being busy is usually solved by introducing an extra queue for the consumer, however such an extra queue is not always possible, for example, when messages are in a data warehouse temporary table associated with the given service. This situation leads to the inefficient processing of the messages in the producer-parallel services-consumer arrangement.

SUMMARY

Shortcomings of the prior art are overcome and additional advantages are provided through the provision of a computer program product for processing messages in a system comprising a plurality of parallel services all serially connected on an output side to a consumer. The computer program product comprises a storage medium readable by a processing circuit and storing instructions for execution by the processing circuit for performing a method. The method includes, for instance: estimating, by a processor, a first time value, wherein the first time value represents an amount of time for a service to process a set of messages; estimating, by the processor, a second time value, wherein the second time value represents an amount of time for a consumer to process the set of messages; based on the first time value and the second time value, dividing, by the processor, the set of messages into a first block of messages and a second block of messages, wherein a size of the second block of messages is larger than a size of the first block of messages; passing, by the processor, the first block of messages to a first service; and passing, by the processor, the second block of messages to a second service, wherein a first time period, in which the second service will process the second block of messages, is equal to a second time period, in which the first service and the consumer will process the first block of messages, wherein the first service and the second service are parallel services and are serially connected on an output side to the consumer.

Shortcomings of the prior art are overcome and additional advantages are provided through the provision of a method of processing messages in a system comprising a plurality of parallel services all serially connected on an output side to a consumer. The method includes, for instance: estimating, by a processor, a first time value, wherein the first time value represents an amount of time for a service to process a set of messages; estimating, by the processor, a second time value, wherein the second time value represents an amount of time for a consumer to process the set of messages; based on the first time value and the second time value, dividing, by the processor, the set of messages into a first block of messages and a second block of messages, wherein a size of the second block of messages is larger than a size of the first block of messages; passing, by the processor, the first block of messages to a first service; and passing, by the processor, the second block of messages to a second service, wherein a first time period, in which the second service will process the second block of messages, is equal to a second time period, in which the first service and the consumer will process the first block of messages, wherein the first service and the second service are parallel services and are serially connected on an output side to the consumer.

Shortcomings of the prior art are overcome and additional advantages are provided through the provision of a system for processing messages in a system comprising a plurality of parallel services all serially connected on an output side to a consumer. The system includes a memory, one or more processor in communication with the memory, and program instructions executable by the one or more processor via the memory to perform a method. The method includes, for instance: estimating, by a processor, a first time value, wherein the first time value represents an amount of time for a service to process a set of messages; estimating, by the processor, a second time value, wherein the second time value represents an amount of time for a consumer to process the set of messages; based on the first time value and the second time value, dividing, by the processor, the set of messages into a first block of messages and a second block of messages, wherein a size of the second block of messages is larger than a size of the first block of messages; passing, by the processor, the first block of messages to a first service; and passing, by the processor, the second block of messages to a second service, wherein a first time period, in which the second service will process the second block of messages, is equal to a second time period, in which the first service and the consumer will process the first block of messages, wherein the first service and the second service are parallel services and are serially connected on an output side to the consumer.

Methods and systems relating to one or more aspects are also described and claimed herein. Further, services relating to one or more aspects are also described and may be claimed herein.

Additional features and advantages are realized through the techniques described herein.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
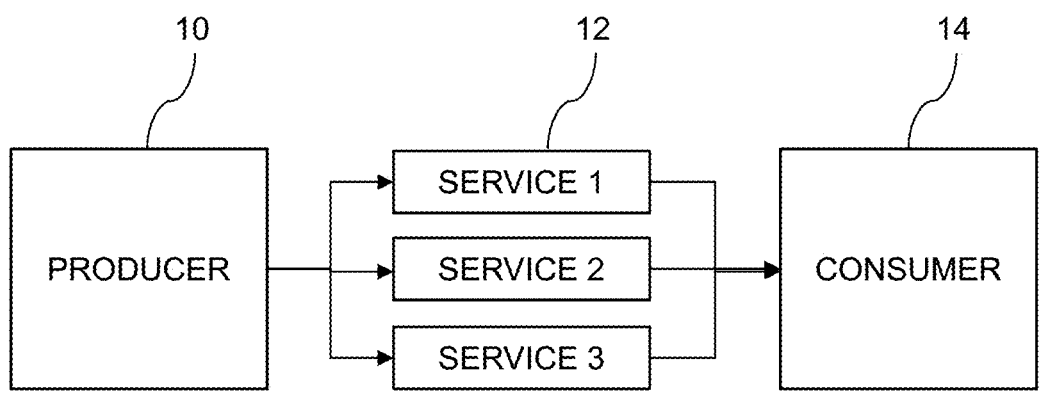
FIG. 1 is a schematic diagram of a system for processing messages, which may be modified by the provision of certain aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures. It should be understood that the Figures are merely schematic and are not drawn to scale.

FIG. 1 is a schematic diagram of a system that comprises a producer 10, a plurality of services 12 and a consumer 14. The producer 10, services 12 and consumer 14 are all in series and the three services 12 are in parallel. The producer 10 produces messages that are processed by the services 12 first and then the consumer second. The system is operated in such a manner that the services 12 will "de-queue" messages from the producer 10 by taking a block of messages that are then processed by the respective service 12 before being passed to the consumer 14. Data at the producer 10 is broken up into messages for handling by the services 12 and the consumer 14.

The system shown in FIG. 1 could be a complex database structure where the consumer 14 is a database and the producer 10 supplies very large data files that are broken up into messages that are first handled by the services 12 and then passed to the database 14, once the services 12 have processed the messages. In the context of FIG. 1, a message is a unit of data that can be processed independently within a system. The message could be formatted or structured in any suitable fashion that allows it to be passed through the system on its own or as part of a larger block of messages.

The parallel nature of the services 12, being serially connected on the output side to the consumer 14, means that delay can occur in the system if the consumer 14 is busy when a service 12 has completed processing a block of messages, which are now ready to be passed to the consumer 14. This situation will result in the service 12 being idle and unable to de-queue further messages from the producer 10. In some cases, an algorithm is used to determine how large a block of messages to take from the producer 10, which in its simplest form uses a threshold and takes either all of the available messages or only up to the threshold, whichever is smaller.

Figure 2:
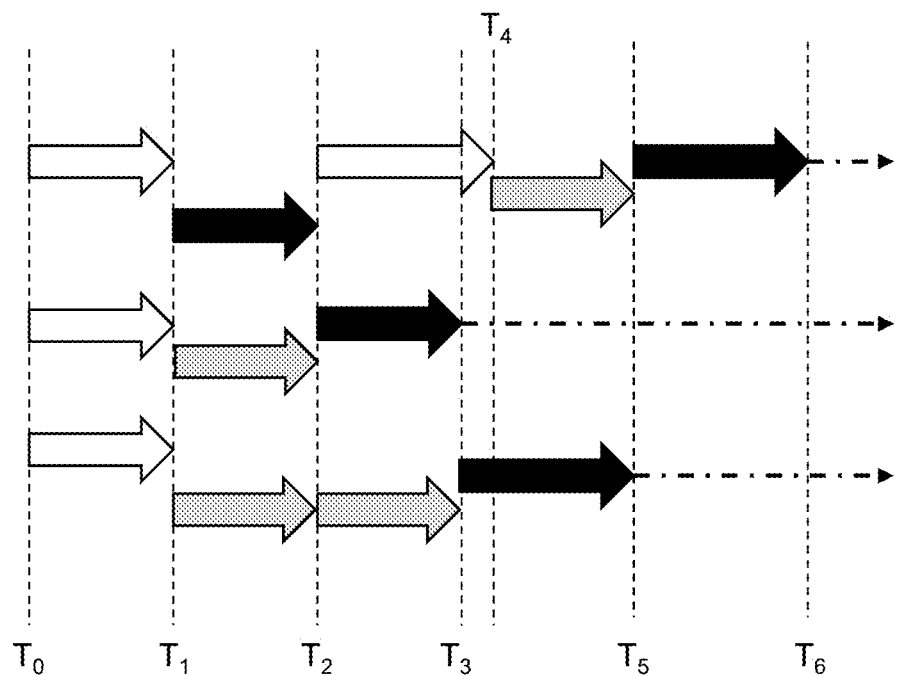
FIG. 2 is a schematic diagram of prior art thread activity.

The thread activity shown in FIG. 2 illustrates the traditional processing using a static threshold. The white arrows correspond to messages being processed by a service 12, the black arrows correspond to the messages being processed by the consumer 14, the grey arrows correspond to a service 12 waiting for the consumer 14, and the dotted arrows correspond to the idle service 12. The four white arrows indicate the total amount of data being produced by the producer 10, which has been split into four equal blocks of messages for processing by the services 12. The time taken from T0 to T6 is the total time taken for the system to process all the messages.

The time of message processing by a service 12 (for example T1−T0) can be used to estimate messages processing times as noted in Equation 1 below.

$$TSTimeTaken = TSconst + TSmsg * Nmsg \qquad \text{(Equation 1)}$$

In Equation 1, TSconst is a fixed overhead of the service 12, TSmsg is a time to process the message and Nmsg is a number of messages passed by the producer 10 to the service 12. Similarly, the time of message processing by the consumer (for example T3−T2) could be estimated utilizing Equation 2 below.

$$TCTimeTaken = TCconst + TCmsg * Nmsg \qquad \text{(Equation 2)}$$

In Equation 2, TCconst is a fixed overhead of the consumer 14, TCmsg is a time to process the message and Nmsg is a number of messages passed by the service 12 to the consumer 14.

In some cases, the time of message processing by the consumer 14 is available only in conjunction with the service waiting time and has to be estimated using statistics received from the other service instances. For example, for the service 2 only the total time T3−T1 may be available, but as the consumer 14 was processing data from the service 1 during the T2−T1 time interval, it may be assumed that the time of processing by the consumer 14 is T3−T2. These statistics can be used to estimate the time that will be taken for individual messages to be processed by a service 12 and by the consumer 14.

The estimation uses a linear equation that assumes that Nmsg is in-between low and high watermarks, where there is linear behavior of the system and there is no resource (CPU, disk 10, network) starvation. The parameters TSconst, TSmsg, TCconst, TCmsg can be calculated from the statistics passed by the services 12 and producer 10 and corrected over time. A linear least square method could be used for such calculation. These parameters could be updated as soon as new collected statistics are available. In this way, accurate statistics can be acquired, which are used to calculate message processing times and are also continually updated as processing occurs in the services 12 and the consumer 14.

It is possible that the parameters will change significantly over course of a day, for example, as a result of peak load, maintenance tasks, resource starvation, etc. In this situation the algorithm may either use filtering to exclude rows with significant standard deviation, or use only the latest rows, or fall back to fixed threshold approach. As data about message processing time is captured, then spikes can occur that may be data outliers and should not be used to predict message processing times. These outliers are detected using standard deviation and any data outside of a specific standard deviation threshold is not used.

The resulting de-queuing algorithm objective could be either the minimal worst case message latency or the minimal average message latency. The choices made about how to partition the blocks of messages amongst the services 12 can be based upon the desired outcome in terms of average processing speed or worst case latency, and so on. The principle used is that blocks of messages are sized in such a way to stagger the blocks as they are passed to the service 12. Different sizes of blocks are used, in order to more efficiently process the entire set of messages. Staggering block sizes results in more efficient use of the consumer 14.

Figure 3:
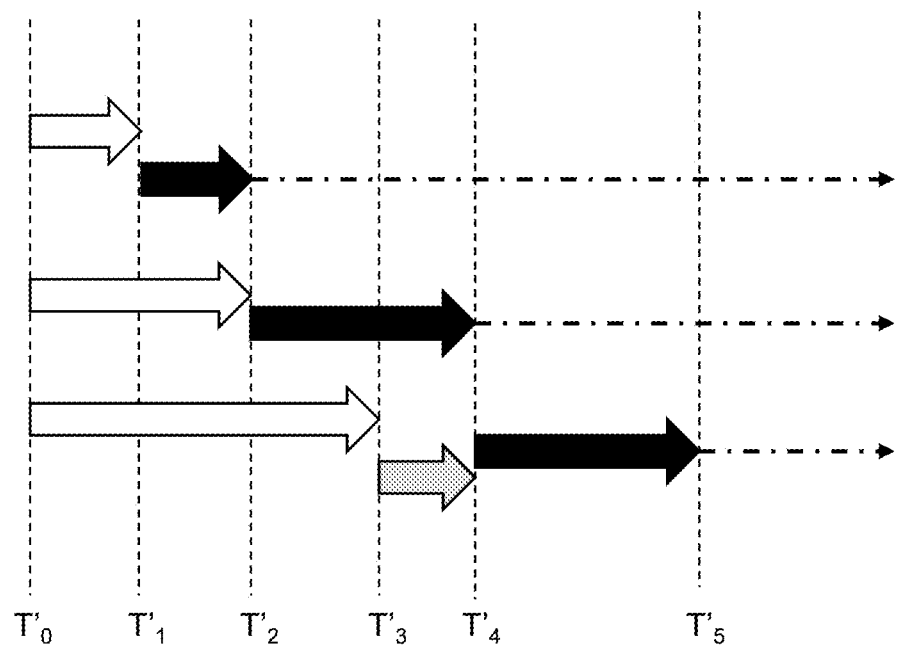
FIG. 3 is a schematic diagram of thread activity in accordance with certain aspects of an embodiment of the present invention.

FIG. 3 illustrates a simple adaptive de-queue scenario. This simple scenario is presented in FIG. 3 and in this scenario, all available messages are consumed in a single iteration. The first service 12 receives for processing a number of messages Nmsg which is equal to a low watermark figure (a minimum threshold) for the algorithm, the second service 12 getting such a number of messages that processing would be completed when the first service 12 will release the consumer 14, and so on. The size of message blocks passed to the services 12 is staggered. In a large number of cases, such a simple scenario will perform visibly better than the static threshold scenario of FIG. 2.

As in the example of FIG. 2, the white arrows correspond to messages being processed by a service 12, the black arrows correspond to the messages being processed by the consumer 14, the grey arrows correspond to a service 12 waiting for the consumer 14, and the dotted arrows correspond to the idle service 12. The three white arrows indicate the total amount of data being produced by the producer 10, which has been split into three unequal blocks of messages for processing by the services 12. The time taken from T'0 to T'5 is the total time taken for the system to process all the messages through the services 12 and consumer 14.

As can be seen from a comparison of the lengths of time taken in FIG. 2 and FIG. 3, the methodology encapsulated in FIG. 3 is much quicker than that shown in FIG. 2. By starting with only a relatively small block at the first service 12 and increasing the size of blocks in consecutive services 12, the amount of down time is reduced significantly. Compared to FIG. 2, there is only a single fairly short grey arrow in FIG. 3, indicating that there is very little waiting time in the de-queuing embodiment of FIG. 3. The messages are processed by the services 12 and consumer 14 much faster when compared to the method of FIG. 2.

Figure 4:
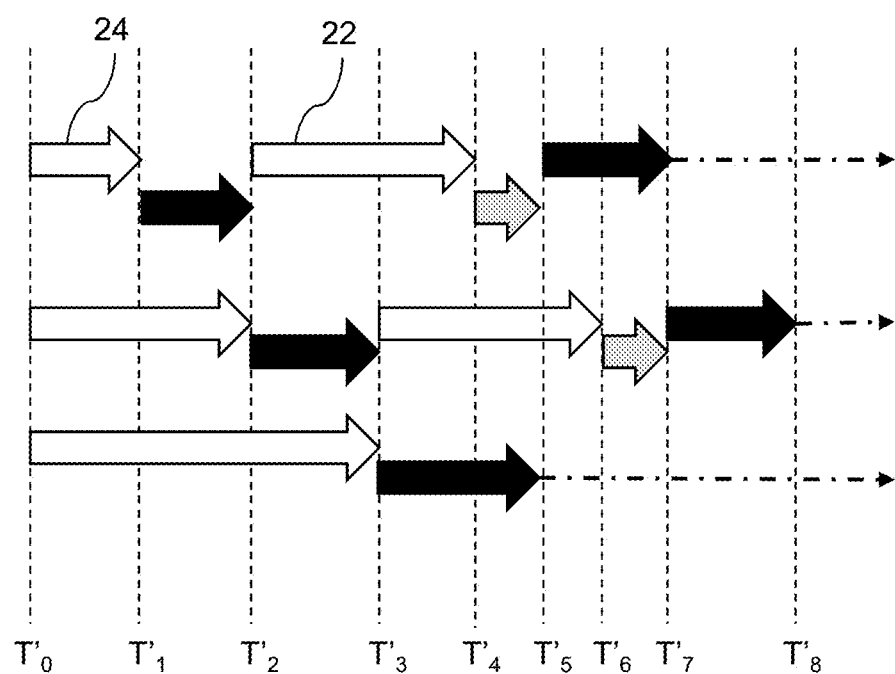
FIG. 4 is a schematic diagram of thread activity in accordance with certain aspects of an embodiment of the present invention.

In an embodiment of the present invention, linear optimization techniques are used when determining the size of message blocks. The thresholds are re-calculated when the next batch of messages is available to the producer 10 or after the next portion of the data is passed to the service instance(s) 12 and new statistics can be updated. FIG. 4 shows an example of thread activity in a situation that uses linear optimization. As the time to process blocks of messages becomes known, this can change the decision about the size of future blocks of messages. The arrow labelled 22 in the Figure is greater in size than the earlier block represented by the arrow labelled 24, for example.

Figure 5:
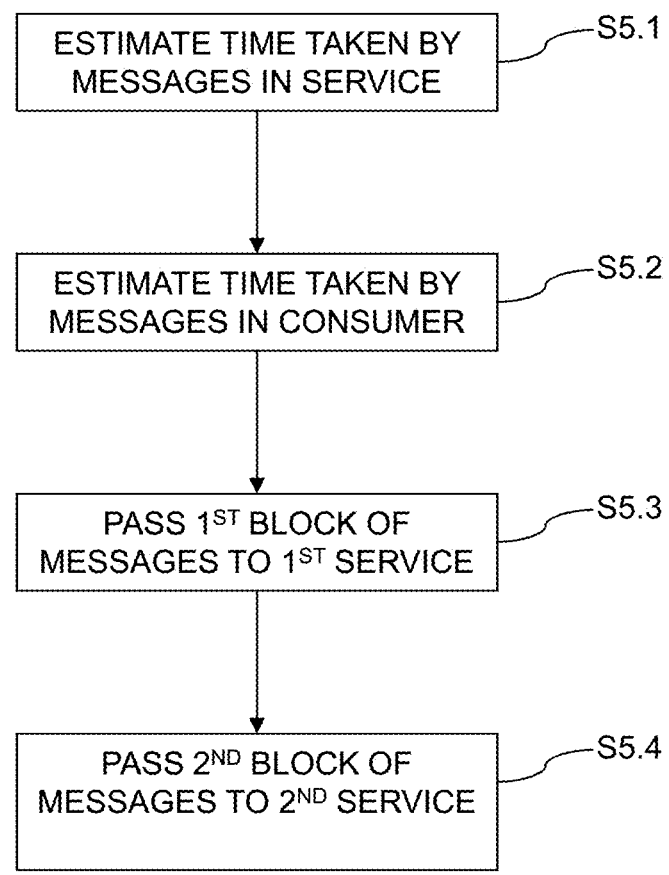
FIG. 5 is a flowchart of a method of processing messages in accordance with certain aspects of an embodiment of the present invention.

FIG. 5 shows a flowchart of a method of processing messages in the system in accordance with an embodiment of the present invention. The method comprises a plurality of parallel services 12 all serially connected on the output side to the consumer 14. The method comprises estimating the time taken for a set of messages to be processed by a service 12, (S5.1), estimating the time taken for a set of messages to be processed by the consumer 14 (S5.2), passing a first block of messages to a first service 12 S5.3, and passing a second block of messages to a second service 12 (S5.4), where the size of the second block of messages is greater than the size of the first block of messages and will be processed by the second service 12 in the time taken for the first block to be processed by the first service 12 and the consumer 14.

As discussed above, an advantage of certain embodiments of the present invention is that they provide a more efficient processing of messages from a producer 10, by staggering the sizes of the blocks of messages that are provided to each of the parallel services 12. Staggering the sizes of the blocks of messages that are provided to each of the parallel services 12 reduces the amount of time that the ultimate consumer 14 is busy, and therefore speeds up the processing of the messages. By acquiring statistics about the length of time to be taken by processing messages in the services 12, and in the consumer 14, it is possible to split the messages from the producer 10, in an efficient manner. Splitting the messages from the producer 10 reduces the amount of time taken to process the messages, for example when compared to a de-queuing algorithm that uses a simple threshold, as shown in FIG. 2. With the staggering of the sizes of the blocks of messages that are provided to the services 12, a more efficient use of resources is achieved, and the consumer 12 will spend less time idle and less time blocked, therefore decreasing the amount of time needed to process all of the messages from the producer 10.

Figure 6:
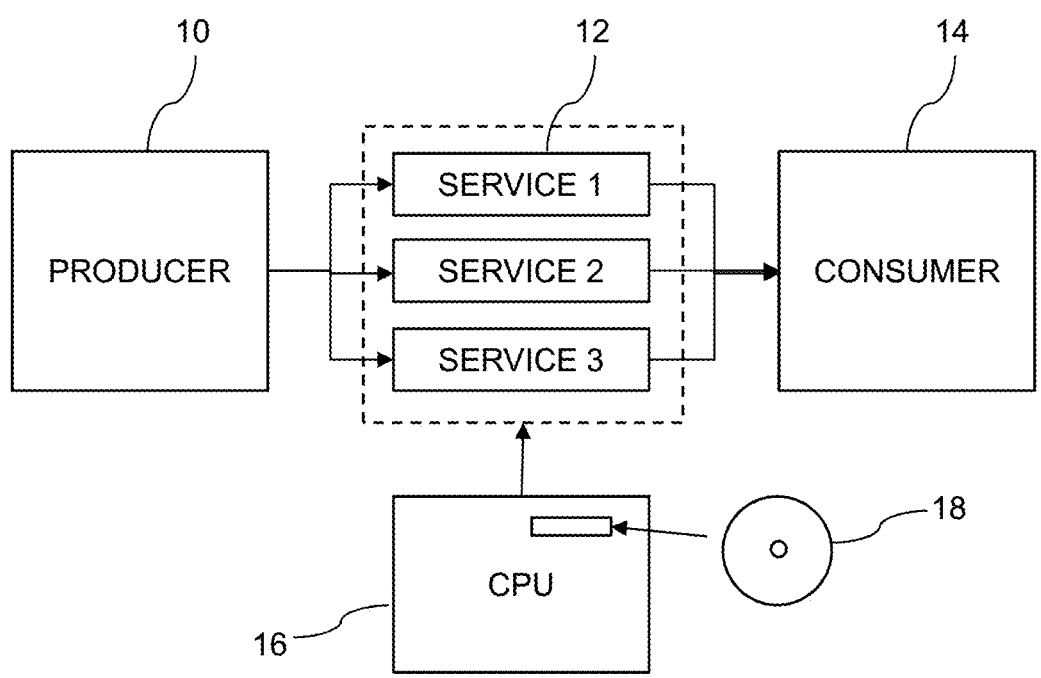
FIG. 6 is a further schematic diagram of a system for processing messages in accordance with certain aspects of an embodiment of the present invention.

FIG. 6 shows a view similar to FIG. 1 of the system, with a device 16, which includes a processor connected to the parallel services 12. The processor of the device 16 is controlled by a computer program product on a computer readable medium 18, which is a CD-ROM 18. The computer program product comprises instructions which are used to control the processor in the de-queuing of messages from the producer 10 and onto the services 12. The de-queuing of messages is operated in accordance with some embodiments of the present invention, for example, with respect to the embodiments illustrated in FIG. 3, for example, to achieve the process efficiency in the operation of the services 12 and the consumer 14, with different sized data blocks being provided to the services 12, in order to stagger the processing of the messages in the services 12.

An aspect of an embodiment of the present invention is a method of processing messages in a system comprising a plurality of parallel services all serially connected on the output side to a consumer, the method comprising estimating the time taken for a set of messages to be processed by a service, estimating the time taken for a set of messages to be processed by the consumer, passing a first block of messages to a first service, and passing a second block of messages to a second service, wherein the size of the second block of messages is greater than the size of the first block of messages and will be processed by the second service in the time taken for the first block to be processed by the first service and the consumer.

Another aspect of an embodiment of the present invention is a device for processing messages in a system comprising a plurality of parallel services all serially connected on the output side to a consumer, the device comprising a processor arranged to estimate the time taken for a set of messages to be processed by a service, estimate the time taken for a set of messages to be processed by the consumer, pass a first block of messages to a first service, and pass a second block of messages to a second service, wherein the size of the second block of messages is greater than the size of the first block of messages and will be processed by the second service in the time taken for the first block to be processed by the first service and the consumer.

A further aspect of an embodiment of the present invention is a computer program product on a computer readable medium for processing messages in a system comprising a plurality of parallel services all serially connected on the output side to a consumer, the product comprising instructions for estimating the time taken for a set of messages to be processed by a service, estimating the time taken for a set of messages to be processed by the consumer, passing a first block of messages to a first service, and passing a second block of messages to a second service, wherein the size of the second block of messages is greater than the size of the first block of messages and will be processed by the second service in the time taken for the first block to be processed by the first service and the consumer.

An advantage of aspects associated with some embodiments of the present invention is that these aspects provide a more efficient processing of the messages from a producer by staggering the amount of messages that are provided to each service of parallel services. Staggering the amount of messages reduces the amount of time that the consumer is busy, and therefore speeds up the processing of the messages. By acquiring statistics about the length of time to be taken by processing messages in the services and in the consumer, it is possible to partition the messages from the producer in a more efficient manner and to reduce the amount of time taken to process the messages, when compared to present de-queuing methods. By staggering of the sizes of the blocks of data that are provided to the services, a more efficient use of resources is achieved, and the consumer will spend less time idle and less time blocked, therefore decreasing the amount of time needed to process all of the messages from the producer.

In an embodiment of the present invention, the size of the message blocks supplied to the services and the number of running services is determined by an optimization method (e.g., an algorithm), for example, using linear optimization. The optimization procedure is to be executed whenever a new block of the messages arrives at the producer or one of the services completes the execution of the current message block.

Aspects of certain embodiment of the present invention provide an advantage by estimating the times taken for a set of messages to be processed by a service and by the consumer and continually updating the values as the first and second blocks of messages are processed, by a respective service and by the consumer. As the system processes messages from the producer, it is advisable to continually update the time of processing statistics, in order that future decisions about the size of message blocks to be used can be as accurate as possible. By continually monitoring the statistics as blocks are processed, efficient decisions about block sizes will be made, since the size of a block depends upon the perceived time it will take for a previous block to pass through the service and the consumer.

In an embodiment of the present invention, a method includes identifying new estimated time statistics that are greater than a predetermined standard deviation from previous estimated time statistics and ignoring the identified new time statistics. While statistics are being gathered, unusual data sets are ignored, as accounting for these sets will lead to inefficient block sizes being selected. Any new data that appears to be too far from previous data (as determined using standard deviation) will not be used, until that data is either rejected as an outlier or the data are accepted when more data is received to confirm the new time statistics for processing of the messages.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, the method comprising:
    estimating, by a processor, a first time value, wherein the first time value represents an amount of time for a service to process a set of messages from a producer;
    estimating, by the processor, a second time value, wherein the second time value represents an amount of time for a consumer to process the set of messages;
    based on the estimated first time value and the estimated second time value, dividing, by the processor, the set of messages into a first block of messages and a second block of messages, the first block of messages and the second block of messages for processing by one or a first service or a second service, wherein the first service and the second service are parallel services, followed by processing by the consumer, and wherein a size of the second block of messages is larger than a size of the first block of messages;
    passing, by the processor, the first block of messages to the first service; and
    passing, by the processor, the second block of messages to the second service, wherein a first time period, in which the second service will process the second block of messages, is equal to a second time period, in which the first service and the consumer will process the first block of messages, wherein the first service and the second service are serially connected on an output side to the consumer.

2. The computer-implemented method of claim 1, wherein the dividing comprises determining the size of the first block of messages in accordance with a minimum threshold.

3. The computer-implemented method of claim 1, further comprising:
    replacing, by the processor, the estimated first time value and the estimated second time value with a re-estimated first time value and a re-estimated second time value, wherein the replacing comprises concurrently re-estimating the first time value and the second time value as the first block of messages and the second blocks of messages are processed.

4. The computer-implemented method of claim 3, further comprising:
    based on the estimated first time value and the estimated second time value, dividing, by the processor, an additional set of messages into an additional first block of messages and an additional second block of messages, wherein a size of the additional second block of messages is larger than a size of the additional first block of messages;
    passing, by the processor, the additional first block of messages to the first service; and
    passing, by the processor, the additional second block of messages to the second service.

5. The computer-implemented method of claim 1, further comprising:
    generating, by the processor, a re-estimated first time value and a re-estimated second time value, wherein the generating comprises concurrently re-estimating the first time value and the second time value, as the first block of messages and the second blocks of messages are processed;
    analyzing, by the processor, the re-estimated first time value and the re-estimated second time value, wherein the analyzing comprises:
        determining, by the processor, if the re-estimated first time value is greater than a predetermined standard deviation from the estimated first time value; and
        determining, by the processor, if the re-estimated second time value is greater than a predetermined standard deviation from the estimated second time value;
    discarding, by the processor, the re-estimated first time value based on determining that the re-estimated first time value is greater than the predetermined standard deviation from the estimated first time value, or updating, by the processor, the estimated first time value with the re-estimated first time based on determining that the re-estimated first time value is not greater than the predetermined standard deviation from the estimated first time value; and
    discarding, by the processor, the re-estimated second time value based on determining that the re-estimated second time value is greater than a predetermined standard deviation from the estimated first time value, or updating, by the processor, the estimated second time value with the re-estimated first time based on determining that the re-estimated first time value is not greater than the predetermined standard deviation from the estimated first time value;

based on the estimated first time value and the estimated second time value, dividing, by the processor, an additional set of messages into an additional first block of messages and an additional second block of messages, wherein a size of the additional second block of messages is larger than a size of the additional first block of messages;

passing, by the processor, the additional first block of messages to the first service; and passing, by the processor, the additional second block of messages to the second service.

6. A computer program product comprising: a computer readable storage medium readable by a processor and storing instructions for execution by the one or more processor for performing a method comprising:

estimating, by a processor, a first time value, wherein the first time value represents an amount of time for a service to process a set of messages from a producer;

estimating, by the processor, a second time value represents an amount of time for a consumer to process the set of messages;

based on the estimated first time value and the estimated second time value, dividing, by the processor, the set of messages into a first block of messages and a second block of messages, the first block of messages and the second block of messages for processing by one or a first service or a second service, wherein the first service and the second service are parallel services, followed by processing by the consumer, and wherein a size of the second block of messages is larger than a size of the first block of messages;

passing, by the processor, the first block of messages to the first service; and passing, by the processor, the second block of messages to the second service, wherein a first time period, in which the second service will process the second block of messages, is equal to a second time period, in which the first service and the consumer will process the first block of messages, wherein the first service and the second service are serially connected on an output side to the consumer.

7. The computer program product of claim 6, wherein the dividing comprises determining the size of the first block of messages in accordance with a minimum threshold.

8. The computer program product of claim 6, the method further comprising:

replacing, by the processor, the estimated first time value and the estimated second time value with a re-estimated first time value and a re-estimated second time value, wherein the replacing comprises concurrently re-estimating the first time value and the second time value as the first block of messages and the second blocks of messages are processed.

9. The computer program product of claim 8, the method further comprising:

based on the estimated first time value and the estimated second time value, dividing, by the processor, an additional set of messages into an additional first block of messages and an additional second block of messages, wherein a size of the additional second block of messages is larger than a size of the additional first block of messages;

passing, by the processor, the additional first block of messages to the first service; and passing, by the processor, the additional second block of messages to the second service.

10. The computer program product of claim 6, the method further comprising:

generating, by the processor, a re-estimated first time value and a re-estimated second time value, wherein the generating comprises concurrently re-estimating the first time value and the second time value, as the first block of messages and the second blocks of messages are processed;

analyzing, by the processor, the re-estimated first time value and the re-estimated second time value, wherein the analyzing comprises:

determining, by the processor, if the re-estimated first time value is greater than a predetermined standard deviation from the estimated first time value; and determining, by the processor, if the re-estimated second time value is greater than a predetermined standard deviation from the estimated second time value;

discarding, by the processor, the re-estimated first time value based on determining that the re-estimated first time value is greater than the predetermined standard deviation from the estimated first time value, or updating, by the processor, the estimated first time value with the re-estimated first time based on determining that the re-estimated first time value is not greater than the predetermined standard deviation from the estimated first time value; and discarding, by the processor, the re-estimated second time value based on determining that the re-estimated second time value is greater than a predetermined standard deviation from the estimated first time value, or updating, by the processor, the estimated second time value with the re-estimated first time based on determining that the re-estimated first time value is not greater than the predetermined standard deviation from the current first time value;

based on the estimated first time value and the estimated second time value, dividing, by the processor, an additional set of messages into an additional first block of messages and an additional second block of messages, wherein a size of the additional second block of messages is larger than a size of the additional first block of messages;

passing, by the processor, the additional first block of messages to the first service; and passing, by the processor, the additional second block of messages to the second service.

11. A system comprising:

a memory;

a processor in communication with the memory; and program instructions executable by the processor via the memory to perform a method, the method comprising:

estimating, by a processor, a first time value, wherein the first time value represents an amount of time for a service to process a set of messages from a producer;

estimating, by the processor, a second time value, wherein the second time value represents an amount of time for a consumer to process the set of messages;

based on the estimated first time value and the estimated second time value, dividing, by the processor, the set of messages into a first block of messages and a second block of messages, the first block of messages and the second block of messages for processing by one or a first service or a second service, wherein the first service and the second service are parallel services, followed by processing by the consumer, and wherein a size of the second block of messages is larger than a size of the first block of messages;

passing, by the processor, the first block of messages to the first service; and passing, by the processor, the second block of messages to the second service, wherein a first time period, in which the second service will process the second block of messages, is equal to a second time period, in which the first service and the consumer will process the first block of messages, wherein the first service and the second service are serially connected on an output side to the consumer.

12. The system of claim 11, wherein the dividing comprises determining the size of the first block of messages in accordance with a minimum threshold.

13. The system of claim 11, the method further comprising:

replacing, by the processor, the estimated first time value and the estimated second time value with a re-estimated first time value and a re-estimated second time value, wherein the replacing comprises concurrently re-estimating the first time value and the second time value as the first block of messages and the second blocks of messages are processed.

14. The system of claim 13, the method further comprising:

based on the estimated first time value and the estimated second time value, dividing, by the processor, an additional set of messages into an additional first block of messages and an additional second block of messages, wherein a size of the additional second block of messages is larger than a size of the additional first block of messages;

passing, by the processor, the additional first block of messages to the first service; and passing, by the processor, the additional second block of messages to the second service.

15. The system of claim 11, the method further comprising:

generating, by the processor, a re-estimated first time value and a re-estimated second time value, wherein the generating comprises concurrently re-estimating the first time value and the second time value, as the first block of messages and the second blocks of messages are processed;

analyzing, by the processor, the re-estimated first time value and the re-estimated second time value, wherein the analyzing comprises:

determining, by the processor, if the re-estimated first time value is greater than a predetermined standard deviation from the estimated first time value; and determining, by the processor, if the re-estimated second time value is greater than a predetermined standard deviation from the estimated second time value;

discarding, by the processor, the re-estimated first time value based on determining that the re-estimated first time value is greater than the predetermined standard deviation from the estimated first time value, or updating, by the processor, the estimated first time value with the re-estimated first time based on determining that the re-estimated first time value is not greater than the predetermined standard deviation from the estimated first time value; and discarding, by the processor, the re-estimated second time value based on determining that the re-estimated second time value is greater than a predetermined standard deviation from the estimated first time value, or updating, by the processor, the estimated second time value with the re-estimated first time based on determining that the re-estimated first time value is not greater than the predetermined standard deviation from the estimated first time value;

based on the estimated first time value and the estimated second time value, dividing, by the processor, an additional set of messages into an additional first block of messages and an additional second block of messages, wherein a size of the additional second block of messages is larger than a size of the additional first block of messages;

passing, by the processor, the additional first block of messages to the first service; and passing, by the processor, the additional second block of messages to the second service.

* * * * *